(12) United States Patent
Mio et al.

(10) Patent No.: US 10,374,217 B2
(45) Date of Patent: Aug. 6, 2019

(54) APPARATUS AND PROCESS FOR PRODUCING ELECTRICITY STORAGE MATERIAL

(71) Applicant: JTEKT CORPORATION, Osaka-shi (JP)

(72) Inventors: Takumi Mio, Kariya (JP); Koji Nishi, Anjo (JP); Sachiko Kubota, Nagoya (JP); Jun Ando, Kobe (JP); Yutaka Ichihara, Konan (JP)

(73) Assignee: JTEKT CORPORATION, Osaka-shi (JP)

( * ) Notice: Subject to any disclaimer, the term of this patent is extended or adjusted under 35 U.S.C. 154(b) by 443 days.

(21) Appl. No.: 14/629,710

(22) Filed: Feb. 24, 2015

(65) Prior Publication Data
US 2015/0243963 A1   Aug. 27, 2015

(30) Foreign Application Priority Data
Feb. 26, 2014   (JP) ................. 2014-035750

(51) Int. Cl.
*H01M 4/00* (2006.01)
*H01M 4/04* (2006.01)
(Continued)

(52) U.S. Cl.
CPC .............. *H01M 4/043* (2013.01); *B29B 7/60* (2013.01); *H01M 4/04* (2013.01); *H01M 4/139* (2013.01);
(Continued)

(58) Field of Classification Search
CPC ........... B29B 7/60; H01M 4/043; H01M 4/04; H01M 4/139; H01M 4/36; H01M 4/62; H01M 4/623; H01M 4/622; Y02P 70/54
See application file for complete search history.

(56) References Cited

U.S. PATENT DOCUMENTS 2,875,311 A * 2/1959 Harkenrider ........ B29C 47/0009
219/618
3,880,407 A * 4/1975 List ........................ B01F 7/048
366/309
(Continued)

FOREIGN PATENT DOCUMENTS

| CN | 102057455 A | 5/2011 |
|---|---|---|
| CN | 103155233 A | 6/2013 |

(Continued)

OTHER PUBLICATIONS

Extended European Search Report dated May 20, 2014 in European Patent Application No. 14154089.8.
(Continued)

*Primary Examiner* — Anshu Bhatia
(74) *Attorney, Agent, or Firm* — Oblon, McClelland, Maier & Neustadt, L.L.P.

(57) ABSTRACT

A production apparatus for producing an electricity storage material is provided. The electricity storage material includes at least a thickener and an active material. The production apparatus includes a solution production device and a mixture-kneading device. The solution production device produces a surfactant-containing solution of the thickener. The mixture-kneading device kneads the solution together with a powder of the active material.

5 Claims, 6 Drawing Sheets

(51) Int. Cl.
    *H01M 4/36* (2006.01)
    *H01M 4/62* (2006.01)
    *B29B 7/60* (2006.01)
    *H01M 4/139* (2010.01)
(52) U.S. Cl.
    CPC ............... *H01M 4/36* (2013.01); *H01M 4/62* (2013.01); *H01M 4/623* (2013.01); *H01M 4/622* (2013.01)

(56) References Cited

U.S. PATENT DOCUMENTS

| | | | |
|---|---|---|---|
| 4,824,256 | A | 4/1989 | Haring et al. |
| 5,424,014 | A * | 6/1995 | Glorioso ............. B29C 44/3442 264/45.3 |
| 5,707,763 | A | 1/1998 | Shimizu et al. |
| 6,019,802 | A | 2/2000 | Ishizuka et al. |
| 6,562,936 | B1 | 5/2003 | Hatono et al. |
| 2009/0117461 | A1 | 5/2009 | Shembel et al. |
| 2009/0279230 | A1 | 11/2009 | Eilertsen et al. |
| 2010/0230641 | A1 | 9/2010 | Oki et al. |
| 2011/0052984 | A1 | 3/2011 | Nakamura et al. |
| 2012/0135291 | A1 | 5/2012 | Patoux et al. |
| 2012/0187347 | A1 | 7/2012 | Eilertsen et al. |
| 2013/0202781 | A1 | 8/2013 | Kobayashi |
| 2014/0225043 | A1 | 8/2014 | Mio et al. |

FOREIGN PATENT DOCUMENTS

| | | |
|---|---|---|
| EP | 0 735 093 A1 | 10/1996 |
| EP | 1 881 546 A2 | 1/2008 |
| EP | 1 881 546 A3 | 1/2008 |
| JP | 8-190912 A | 7/1996 |
| JP | 10-92436 | 4/1998 |
| JP | 2000-306598 A | 11/2000 |
| JP | 2001-250558 | 9/2001 |
| JP | 2001-328813 A | 11/2001 |
| JP | 2005-276502 A | 10/2005 |
| JP | 2006-310120 A | 11/2006 |
| JP | 2008-034377 A | 2/2008 |
| JP | 4104645 B2 | 6/2008 |
| JP | 2011-522398 A | 7/2011 |
| JP | 2011-204576 A | 10/2011 |
| JP | 2011-228062 A | 11/2011 |
| JP | 4941692 B2 | 5/2012 |
| JP | 2014-17064 A | 1/2014 |
| WO | WO 2007/126400 A1 | 11/2007 |
| WO | WO 2011/001848 A1 | 1/2011 |
| WO | WO 2012/046305 A1 | 4/2012 |
| WO | WO 2013/129254 A1 | 9/2013 |
| WO | WO 2013/166598 A1 | 11/2013 |

OTHER PUBLICATIONS

Extended European Search Report dated May 13, 2015 in Patent Application No. 15156483.8.
U.S. Appl. No. 14/851,264, filed Sep. 11, 2015, Mio, et al.
European Office Action dated Mar. 1, 2016 in Patent Application 15 156 483.8.
Japanese Office Action dated Nov. 16, 2017 in Patent Application No. 2014-035750 (with English translation), 10 pages.
Combined Chinese Office Action and Search Report dated Jun. 13, 2018 in Chinese Patent Application No. 201510088830.9 (with English translation), 18 pages.

* cited by examiner

APPARATUS AND PROCESS FOR PRODUCING ELECTRICITY STORAGE MATERIAL

BACKGROUND

The present invention relates to an apparatus and a process for producing an electricity storage material.

In recent years, lithium ion secondary batteries are in use in hybrid vehicles, electric vehicles, and the like. Electrodes of lithium ion secondary batteries are produced by kneading an active material in a powder or another form together with a solution of a thickener in order to obtain a slurry of electricity storage material, subsequently applying the electricity storage material slurry to a substrate, e.g., an aluminum foil, and drying the slurry applied. The lithium ion secondary battery is produced by cutting such electrodes into given sizes, stacking the cut electrodes together with a separator interposed therebetween, and enclosing the stack in a case together with a nonaqueous electrolytic solution.

Patent document 1 describes an electricity storage material slurry which contains a fluorochemical surfactant so as to be evenly applied to substrates. Patent document 2 describes an electrode which employs a carbon material as an active material and in which the carbon layer contains a nonionic surfactant so as to have enhanced wettability by nonaqueous electrolytic solutions.

[Patent Document 1] JP-A-2001-250558
[Patent Document 2] JP-A-10-92436

SUMMARY

It is therefore one advantageous aspect of the present invention to provide an apparatus and a process for producing an electricity storage material, the apparatus and the process having a feature wherein a mixture of a powder of an active material, a solution of a thickener, etc. is easy to convey.

According to an advantageous aspect of the invention, there is provided a production apparatus for producing an electricity storage material which includes at least a thickener and an active material, the production apparatus comprising:

a solution production device for producing a surfactant-containing solution of the thickener and a mixture-kneading device for kneading the solution together with a powder of the active material.

The mixture-kneading device may include a mixture-conveying device which conveys a mixture of the solution and the powder of the active material.

The solution production device may include: a thickener dissolution device for dissolving the surfactant and the thickener in a solvent, and a viscosity regulation device for regulating the solution so as to have a given viscosity.

According to anther advantageous aspect of the invention, there is provided a method for producing an electricity storage material which includes at least a thickener and an active material, the method comprising:

a solution production step in which a surfactant-containing solution of the thickener is produced; and a mixture-kneading step in which the solution is kneaded together with a powder of the active material.

The method may further comprise a mixture-conveying step in which a mixture of the solution and the powder of the active material is conveyed.

The solution production step may include: a thickener dissolution step in which the surfactant and the thickener are dissolved in a solvent, and a viscosity regulation step in which the solution is regulated so as to have a given viscosity.

The surfactant may be a fluorochemical material.

The fluorochemical material may have an affinity for water.

The surfactant may be added in an amount of 0.01-0.3% by weight.

DETAILED DESCRIPTION OF EXEMPLIFIED EMBODIMENTS

Figure 1:
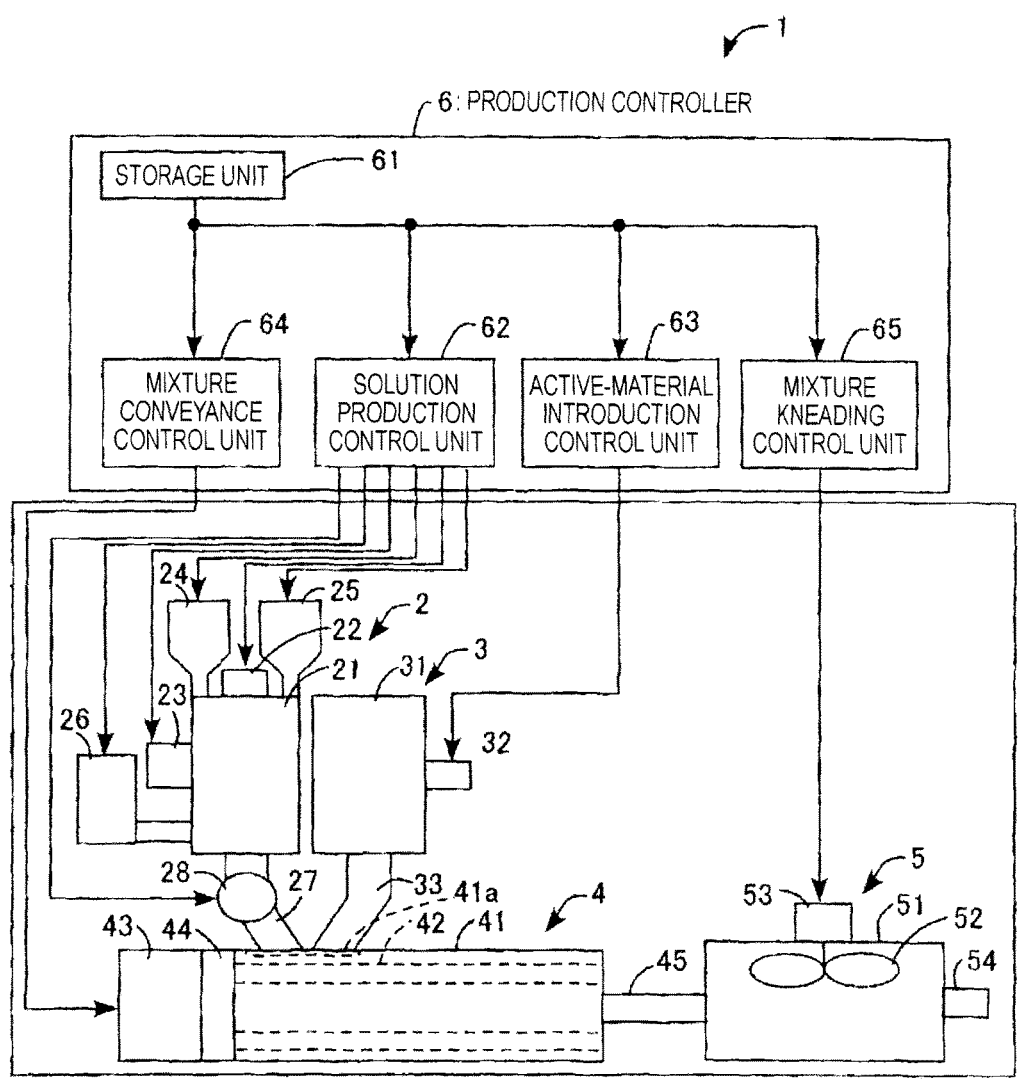
FIG. 1 is a view which diagrammatically shows the configuration of an electricity-storage-material production apparatus as an embodiment of the invention.

In patent documents 1 and 2, a slurry of electricity storage materials is produced by introducing a thickener, a solvent, and an active material in a powder or another form into a vessel at a time and kneading the mixture, that is, produced through a batch treatment. Since the demand for lithium ion secondary batteries is remarkably growing in recent years, there is a desire for slurry production through a continuous treatment. However, since powders of active materials are less apt to be wetted by thickener solutions, the mixture of a powder of an active material and a thickener solution is prone to accumulate within the production apparatus. The accumulated mixture is difficult to convey, and this is an obstacle to continuous slurry production.

An object of the invention, which has been achieved under these circumstances, is to provide an apparatus and a process for producing an electricity storage material, the apparatus and the process having a feature wherein a mixture of a powder of an active material, a solution of a thickener, etc. is easy to convey.

(Electricity Storage Material to be Produced by the Production Process and Production Apparatus)

The process and production apparatus an electricity storage material according to this embodiment configure part of a process and production apparatus, for example, the electrodes (positive electrode and negative electrode) of a lithium ion secondary battery. The electrodes of a lithium ion secondary battery are each produced by applying a slurry of electricity storage materials as an electricity storage material to a substrate, e.g., an aluminum foil or a copper foil, and drying the slurry. The process and production apparatus an electricity storage material according to this embodiment are a process and an production apparatus the slurry of electricity storage materials.

Examples of the electricity storage materials are as follows. In the case of the positive electrode, examples of the electricity storage materials include lithium nickel oxides (solid ingredient) as an active material, N-methylpyrrolidone (liquid ingredient) as a solvent, acetylene black as a conduction aid, and poly(vinylidene fluoride) as a binder. In the case of the negative electrode, examples of the electricity storage materials include graphite (solid ingredient) as an active material, water (liquid ingredient) as a solvent, carboxymethyl cellulose as a thickener, and SBR rubbers and poly(acrylic acid) as binders. An explanation is given below on electricity storage materials for the negative electrode.

As stated hereinabove, powders of active materials are less apt to be wetted by solutions of thickeners and this poor wettability is an obstacle to continuous kneading. It is therefore necessary to improve the wettability of a powder of an active material by thickener solutions, that is, to heighten the rate of wetting. The rate of wetting can be represented by both the wetting angle, which is represented by the surface tension of the powder of an active material and the surface tension of the solution of a thickener, and the viscosity of the solution of a thickener.

For heightening the rate of wetting, use may be made of an expedient in which the surface tension of the powder of an active material is increased to enlarge the wetting angle, an expedient in which the surface tension of the solution of a thickener is reduced to enlarge the wetting angle, or an expedient in which the viscosity of the solution of a thickener is reduced. For increasing the surface tension of the powder of an active material, a surface modification by ultraviolet irradiation may be performed. For reducing the surface tension of the solution of a thickener, use may be made of a method in which a surfactant is added or the temperature is elevated. For reducing the viscosity of the solution of a thickener, use may be made of a method in which the temperature is elevated or the molecular weight is changed. As a result of experiments, it was found that the most effective method for heightening the rate of wetting, among those expedients, is to add a surfactant to reduce the surface tension of the solution of a thickener.

There are nonionic surfactants and ionic surfactants. Although the ionic surfactants include cationic surfactants, anionic surfactants, and amphoteric surfactants, all of these surfactants are excluded because these surfactants inhibit charge/discharge reactions. The nonionic surfactants include ester type, ether type, and ester-ether type surfactants. However, all of the ester type, ether type, and ester-ether type surfactants are excluded because these surfactants are susceptible to oxidation/reduction, pyrolysis, etc. and have insufficient chemical stability.

Other examples of the nonionic surfactants include sugar chain type, phospholipid type, and fluorochemical surfactants. However, the sugar chain type and the phospholipid type surfactants are excluded because these surfactants are prone to decompose during charge/discharge. Meanwhile, the fluorochemical surfactants have high chemical stability and do not decompose during charge/discharge and, hence, are usable as surfactants which improve the wettability of the powder of an active material by the solution of a thickener. In addition, the fluorochemical surfactants can heighten battery performance.

Figure 11:
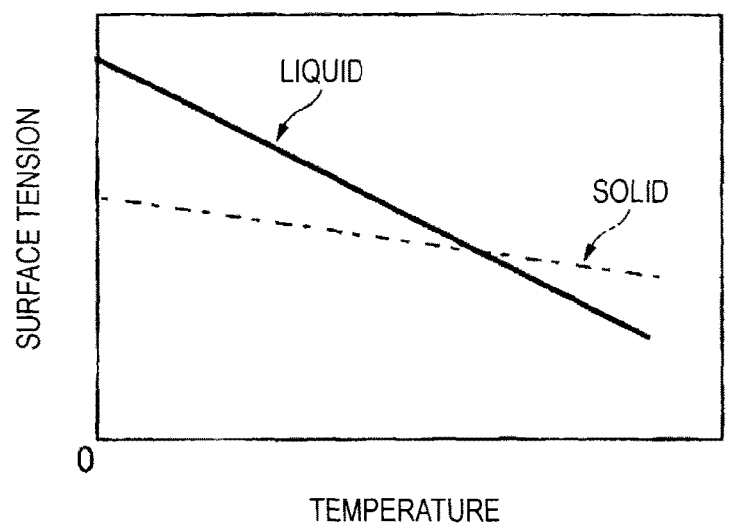
FIG. 11 is a presentation which shows changes in surface tension of a liquid and a solid with changing temperature.

The fluorochemical surfactants include hydrophobic surfactants (which have a low affinity for water (i.e., have a solubility in 25° C. water of less than 1% by weight)) and hydrophilic surfactants (which have a high affinity for water (i.e., have a solubility in 25° C. water of 1% by weight or higher). An experiment on the rate of wetting was conducted with respect to each of these two types of surfactants. The rate of wetting was evaluated by dropping a powder of an active material onto the surface of each of thickener solutions to which a hydrophobic fluorochemical surfactant and a hydrophilic fluorochemical surfactant have respectively been added in a given amount and measuring the sedimentation time, which is the time period required for the powder of an active material to reach the bottom of each surfactant-containing thickener solution. The reason why the temperature of the thickener solutions was set at 25° C. is that since liquids undergo a larger increase or decrease in surface tension with temperature (give a graph having a larger inclination) than solids as shown in FIG. 11, to elevate the temperature of the thickener solution is more effective in improving wetting than to elevate the temperature of the active material.

Figure 3:
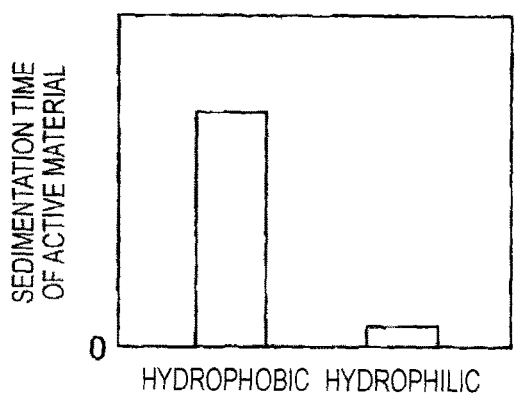
FIG. 3 is a presentation which shows the sedimentation rates of an active material in thickener solutions to which a hydrophobic fluorochemical surfactant and a hydrophilic fluorochemical surfactant have respectively been added.

As a result of the experiment, it was found that the hydrophilic fluorochemical surfactant shortens the sedimentation time of the active-material powder more than the hydrophobic fluorochemical surfactant as shown in FIG. 3. The hydrophilic fluorochemical surfactant can greatly improve the wettability of the active-material powder by the surfactant-containing thickener solution and can further enhance battery performance. Examples of this hydrophilic fluorochemical surfactant include hexafluoropropene derivatives. Incidentally, the active-material powder did not sediment at all when added to the thickener solution to which no fluorochemical surfactant had been added. Addition of the hydrophobic fluorochemical surfactant hence is also effective.

Figure 4:
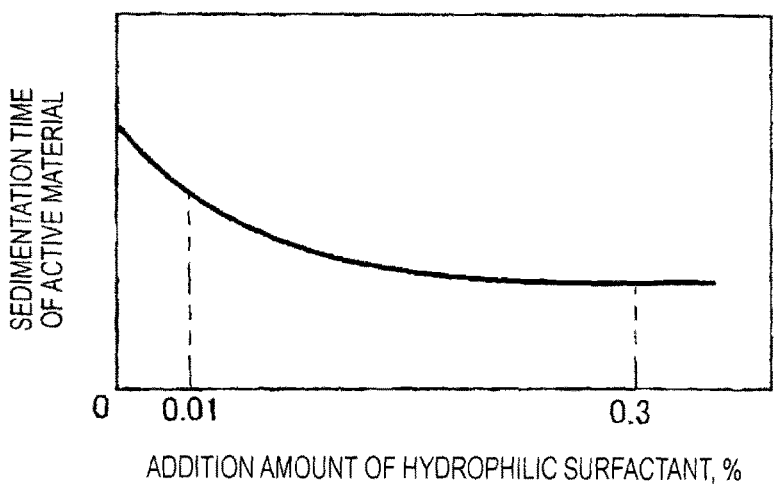
FIG. 4 is a presentation which shows a relationship between the addition amount of a hydrophilic fluorochemical surfactant and the sedimentation rate of an active material.

Next, an experiment was conducted on whether the rate of wetting changed or not with the addition amount of a hydrophilic fluorochemical surfactant. As a result of the experiment, it was found that addition amounts of the hydrophilic fluorochemical surfactant less than 0.01% by weight result in too long a sedimentation time of the active-material powder as shown in FIG. 4, while addition amounts thereof exceeding 0.3% by weight result in enhanced frothing of the thickener solution to render the solution difficult to handle. Consequently, a suitable range of the addition amount thereof is 0.01-0.3% by weight.

Next, an experiment was conducted on whether the addition of a hydrophilic fluorochemical surfactant affected battery performance. The battery performance is evaluated in terms of the rate of capacity decrease of a lithium ion secondary battery. Here, the rate of capacity decrease is expressed in terms of the number of charge/discharge operations performed until the lithium ion secondary battery having an initial state of charge of 100% decreases in the state of charge to, for example, 60% through repetitions of charge/discharge. As a result of the experiment, it was found that the addition of the hydrophilic fluorochemical surfactant is more effective in lowering the rate of capacity decrease than in the case of not adding the surfactant and is capable of improving the battery performance.

(Configuration of the Production Apparatus Electricity Storage Material)

The apparatus for electricity-storage-material production according to this embodiment is explained while referring to FIG. 1. The apparatus 1 for producing an electricity storage material is configured so as to include a solution production device 2, an active-material feeder 3, a mixture-conveying device 4, a mixture-kneading device 5, a production controller 6, etc.

The solution production device 2 is a device in which a surfactant and a thickener are added to a solvent to dissolve the surfactant and the thickener in the solvent and in which the viscosity of the thickener solution containing the surfactant is regulated. This device 2 is equipped with a housing 21, a microwave device 22, an ultrasonic wave device 23, a first hopper 24, a second hopper 25, a reservoir tank 26, a supply line 27, a constant-delivery pump 28, etc.

The housing 21 has a hollow cylindrical shape, and has been disposed so that the axial direction is vertical. The microwave device 22 is equipped with a magnetron, and has been disposed on the top of the housing 21. The ultrasonic wave device 23 has been disposed on the outer periphery of the housing 21, and includes an ultrasonic-wave generation element, e.g., a piezoelectric element, that has been fixed to the peripheral surface of the housing 21 so as to be in close contact therewith. The first hopper 24 has been disposed so as to project from the top of the housing 21 so that a thickener can be retained therein and introduced into the housing 21.

The second hopper 25 has been disposed so as to project from the top of the housing 21 so that a surfactant can be retained therein and introduced into the housing 21. The reservoir tank 26 has been disposed consecutively to the outer periphery of the housing 21 so that a solvent can be retained therein and supplied into the housing 21. The supply line 27 has been connected to the bottom of the housing 21 so that a surfactant-containing thickener solution can be supplied to the mixture-conveying device 4. The constant-delivery pump 28 has been disposed somewhere in the supply line 27.

The active-material feeder 3 is a device which feeds an active material in a powder or another form to the mixture-conveying device 4 in a given amount by means of loss-in-weight control, and is equipped with a housing 31, a low-frequency generator 32, a supply line 33, etc. The housing 31 has a hollow cylindrical shape, and has been disposed so that the axial direction is vertical. The low-frequency generator 32 has been disposed on the outer periphery of the housing 31, and includes a solenoid that has been fixed to the peripheral surface of the housing 31. The supply line 33 has been connected to the bottom of the housing 31 so that the active-material powder can be supplied to the mixture-conveying device 4.

The mixture-conveying device 4 is a device which conveys a mixture of a powder of an active material, a surfactant-containing thickener solution, etc. (hereinafter referred to simply as "mixture"), and is equipped with a housing 41, a pair of screws 42, a driving motor 43, a gear mechanism 44, a supply line 45, etc. The housing 41 has an approximately hollow cylindrical shape, and has been disposed so that the axial direction is horizontal. In the housing 41, a one-end-side upper part thereof has an opening 41a, to which the outlet of the supply line 27 of the solution production device 2 and the outlet of the supply line 33 of the active-material feeder 3 are connected.

The two screws 42 have been disposed in parallel and side by side within the housing 41, and the rotating shafts of the pair of screws 42 are rotatably supported by both end faces of the housing 41 so that the two screws 42 can be rotated on the respective axes in the same direction or opposite directions while mating with each other. The driving motor 43 has been fixed to one end face, i.e., the end face on the rear-end side of the pair of screws 42, of the housing 41, and the motor shaft of the driving motor 43 has been connected to the rotating shafts of the pair of screws 42 through the gear mechanism 44. The supply line 45 has been connected to the other end face, i.e., the end face on the front-end side of the pair of screws 42, of the housing 41 so that the mixture can be supplied to the mixture-kneading device 5.

The mixture-kneading device 5 is a device for kneading the mixture, and is equipped with a housing 51, a stirring propeller 52, a driving motor 53, a discharge line 54, etc. The housing 51 has a hollow cylindrical shape, and has been disposed so that the axial direction is vertical. The rotating shaft of the stirring propeller 52 is rotatably supported by a central part of the top of the housing 51 so that the stirring propeller 52 can be rotated inside the housing 51. The driving motor 53 has been fixed to the upper part of the top of the housing 51, and the motor shaft of the driving motor 53 has been connected to the rotating shaft of the stirring propeller 52. The discharge line 54 has been connected to the circumferential surface of the housing 51 so that a slurry (kneaded mixture) of electricity storage materials can be discharged to the outside.

The production controller 6 is equipped with a storage unit 61, a solution production control unit 62, an active-material introduction control unit 63, a mixture conveyance control unit 64, a mixture kneading control unit 65, etc.

Stored in the storage unit 61 are: data showing a relationship between the degree of dissolution in a surfactant-containing thickener solution and the viscosity of the surfactant-containing thickener solution (see FIG. 5); data showing a relationship between the viscosity of the surfactant-containing thickener solution and the period used for dissolving the surfactant-containing thickener (see FIG. 6); data showing a relationship between the viscosity of a slurry of electricity storage materials and the viscosity of the surfactant-containing thickener solution (see FIG. 7); data showing a relationship between the viscosity of a surfactant-containing thickener solution and the period of ultrasonic-wave propagation (see FIG. 8); and other data on dissolution control, viscosity regulation, kneading control, etc.

The solution production control unit 62 is a control unit which controls the operation of the solution production device 2. This control unit 62 operates the microwave device 22 to generate microwaves and propagate the microwaves to the solvent introduced into the housing 21, thereby dissolving the surfactant and the thickener in the solvent. The control unit 62 further operates the ultrasonic wave device 23 to generate ultrasonic waves and propagate the ultrasonic waves to the surfactant-containing thickener solution introduced into the housing 21, thereby regulating the viscosity of the solution.

Namely, the solution production control unit 62 determines the viscosity of the surfactant-containing thickener solution on the basis of the viscosity of the final slurry of electricity storage materials, and controls the viscosity regulation in which ultrasonic waves are propagated to the solution for a given time period so as to result in the viscosity determined. Moreover, the solution production control unit 62 operates and controls the constant-delivery pump 28 to supply the thickener solution, which contains a surfactant in a given amount, to the mixture-conveying device 4 via the supply line 27.

The active-material introduction control unit 63 is a control unit which controls the operation of the active-material feeder 3. This control unit 63 operates the low-frequency generator 32 to generate low-frequency and prevent the active-material powder within the housing 31 from forming a bridge, and feeds the active material in a powder or another form to the mixture-conveying device 4 in a given amount via the supply line 33 by means of loss-in-weight control.

The mixture conveyance control unit 64 is a control unit which controls the operation of the mixture-conveying device 4. This control unit 64 operates the driving motor 43 to rotate the pair of screws 42 on the respective axes. The mixture-conveying device 4 stirs and thereby mixes the surfactant-containing thickener solution and the active material in a powder or another form, which are being supplied through the opening 41a of the housing 41, and conveys the resultant mixture from the screw rear end toward the screw front end, while mixing the ingredients. The device 4 thus supplies the mixture to the mixture-kneading device 5 via the supply line 45.

The mixture kneading control unit 65 is a control unit which controls the operation of the mixture-kneading device 5. This control unit 65 operates the driving motor 53 to rotate the stirring propeller 52 and stir and thereby knead the mixture supplied into the housing 51, thereby producing a slurry of electricity storage materials. Although details will be stated later, kneading indexes are set on the basis of the kinetic energy of the active-material particles, the mean free path of the active-material particles, and the period of kneading the electricity storage materials. The mixture kneading control unit 65 sets conditions for the kneading so that the set kneading indexes are not above target values, and controls the kneading of the electricity storage materials in accordance with the set kneading conditions.

(Processing by the Production Controller)

Figure 2:
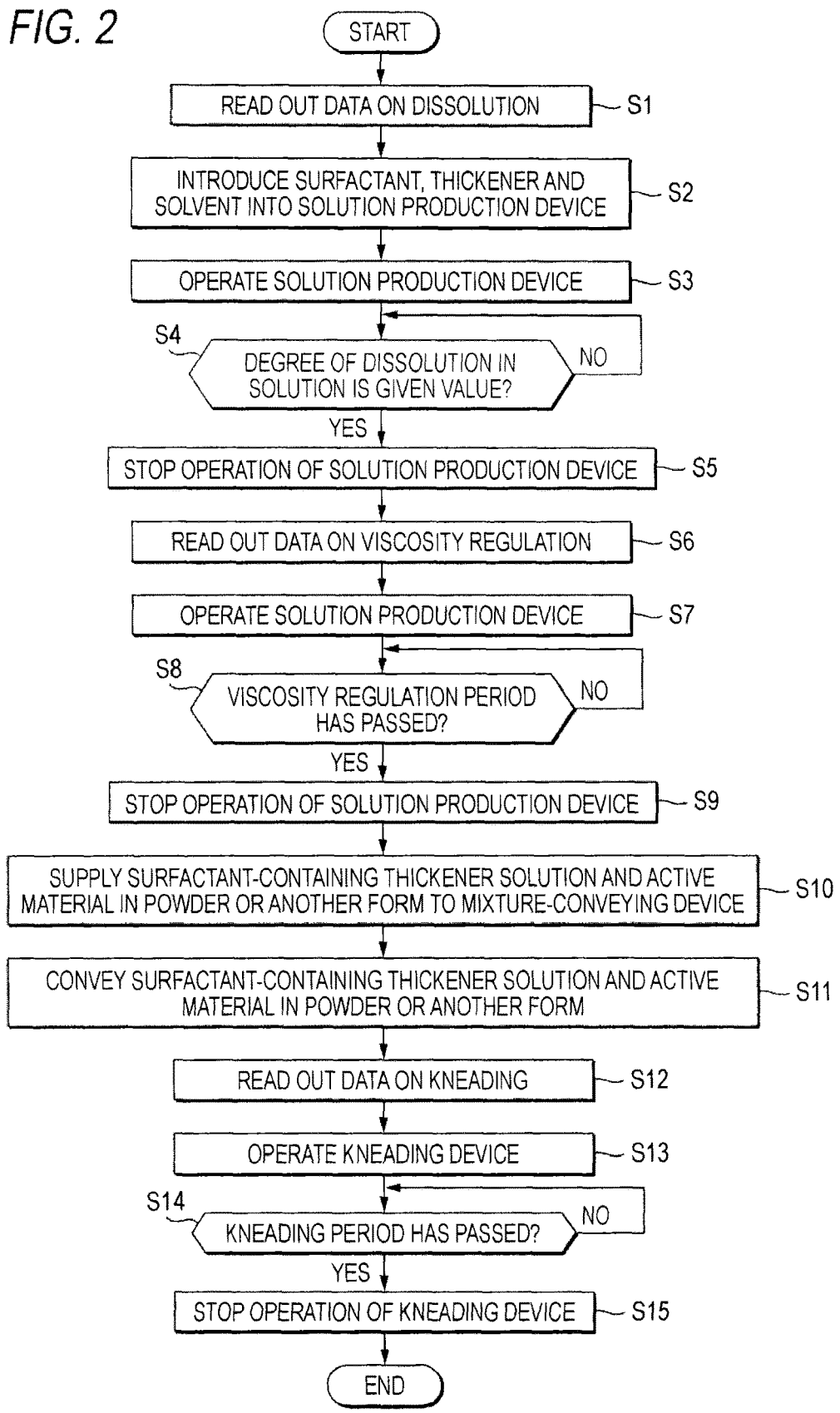
FIG. 2 is a flowchart which shows processing conducted by a production controller of the electricity-storage-material production apparatus as an embodiment of the invention.

Next, the processing by the production controller 6 is explained while referring to FIG. 2. The production controller 6 reads out the data on the dissolution of a surfactant-containing thickener (step S1 in FIG. 2) to introduce the surfactant, thickener, solvent, etc. into the solution production device 2 (step S2 in FIG. 2). The sequence of introduction is not limited, and either the surfactant or the thickener may be introduced first. The production controller 6 operates the solution production device 2 (step S3 in FIG. 2), and at the time when the degree of dissolution in the surfactant-containing thickener solution has reached a given value (step S4 in FIG. 2), the production controller 6 stops the operation of the solution production device 2 (step S5 in FIG. 2).

Specifically, the solution production control unit 62 reads the data on a relationship between the viscosity of the surfactant-containing thickener solution and the degree of dissolution in the surfactant-containing thickener solution and the data on a relationship between the viscosity of the surfactant-containing thickener solution and the period used for dissolving the surfactant-containing thickener, out of the storage unit 61. The solution production control unit 62 supplies a given amount of a solvent into the housing 21 via the reservoir tank 26, introduces a given amount of the thickener into the housing 21 via the first hopper 24, and introduces a given amount of the surfactant into the housing 21 via the second hopper 25.

The solution production control unit 62 operates the microwave device 22 to propagate microwaves to the solvent within the housing 21 to dissolve the thickener which contains the surfactant. After the microwave device 22 is operated until the degree of dissolution in the surfactant-containing thickener solution has reached a given value, the solution production control unit 62 stops the operation of the microwave device 22.

Figure 5:
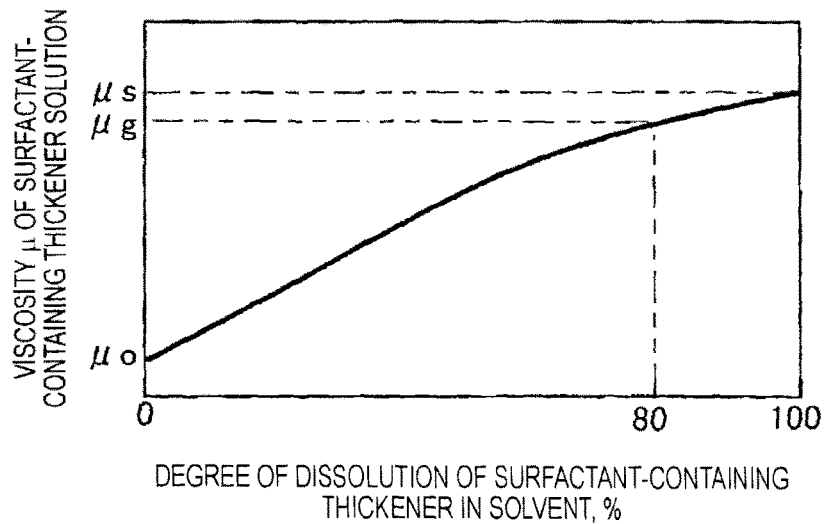
FIG. 5 is a presentation which shows a relationship between the viscosity of a surfactant-containing thickener solution and the degree of dissolution therein.

Namely, as shown in FIG. 5, the viscosity $\mu$ of the surfactant-containing thickener solution increases from $\mu o$, which is the viscosity measured at the time when the surfactant and the thickener have just been introduced into a solvent and when the surfactant and the thickener have not dissolved in the solvent and the degree of dissolution is 0%, to $\mu g$ ($>\mu o$) at the time when the degree of dissolution reaches 80%, and further increases to $\mu s$ ($>\mu g$) at the time when the surfactant and the thickener have completely dissolved in the solvent and the degree of dissolution has reached 100%.

Figure 6:
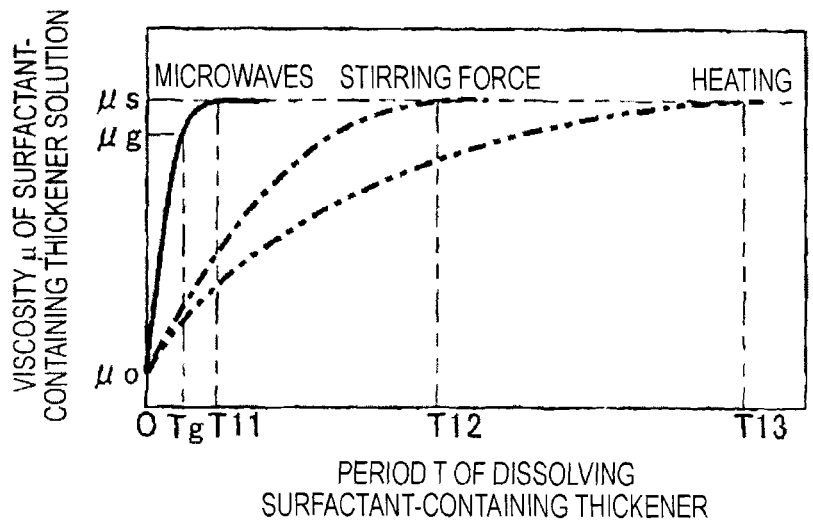
FIG. 6 is a presentation which shows changes with passage of time of the viscosity of a thickener solution being produced with microwaves, the viscosity of a thickener solution being produced with stirring force, and the viscosity of a thickener solution being produced with heating.

In cases when the microwave device 22 is operated until the degree of dissolution in the surfactant-containing thickener solution reaches 80%, the period of operating the microwave device 22, i.e., the time period T to be used for dissolving the thickener containing the surfactant, is Tg, which is the time required for the viscosity $\mu$ of the surfactant-containing thickener solution to increase from $\mu o$ to $\mu g$, as shown in FIG. 6. Here, the dissolution with microwaves is accomplished by propagating microwaves to the solvent to oscillate the solvent and thereby infiltrating the solvent into the surfactant and the thickener. It is desirable that the range of frequencies of the microwaves should be one in which the solvent is apt to absorb the energy of the microwaves. For example, in the case of using water as the solvent, a frequency range of 0.9-400 GHz is used.

Dissolution of the thickener containing a surfactant may be conducted by stirring as before. In this embodiment, however, the solvent is oscillated with microwaves to dissolve the surfactant and the thickener in the solvent. This is because the dissolution of the surfactant-containing thickener in a solvent by means of oscillation caused by microwaves can be more efficiently conducted than the dissolution of the surfactant-containing thickener in a solvent by means of stirring force and than the dissolution of the surfactant-containing thickener by heating, e.g., the dissolution thereof in a solvent heated to a high temperature, as shown in FIG. 6.

Namely, the time period T required for regulating the viscosity of the surfactant-containing thickener solution to the target value $\mu s$ is T12 in the case of the dissolution by stirring force or is T13 ($>$T12) in the case of the dissolution by heating. In contrast, the time period T can be as short as T11 ($<$T12$<$T13) in the case of the dissolution by microwaves. Consequently, the dissolution by microwaves requires less electric power than the dissolution by stirring force.

Next, the production controller 6 reads out the data on viscosity regulation (step S6 in FIG. 2), operates the solution production device 2 (step S7 in FIG. 2), and assesses whether a given viscosity regulation period has passed or not (step S8 in FIG. 2). At the time when the given viscosity regulation period has passed, the production controller 6 stops the operation of the solution production device 2 (step S9 in FIG. 2).

Specifically, the solution production control unit 62 operates the ultrasonic wave device 23 to propagate ultrasonic waves to the surfactant-containing thickener solution within the housing 21 for a given viscosity regulation period, thereby regulating the viscosity of the surfactant-containing thickener solution. At the time when the ultrasonic wave device 23 has been operated until the viscosity of the surfactant-containing thickener solution reaches a given value, the solution production control unit 62 stops the operation of the ultrasonic wave device 23.

Figure 7:
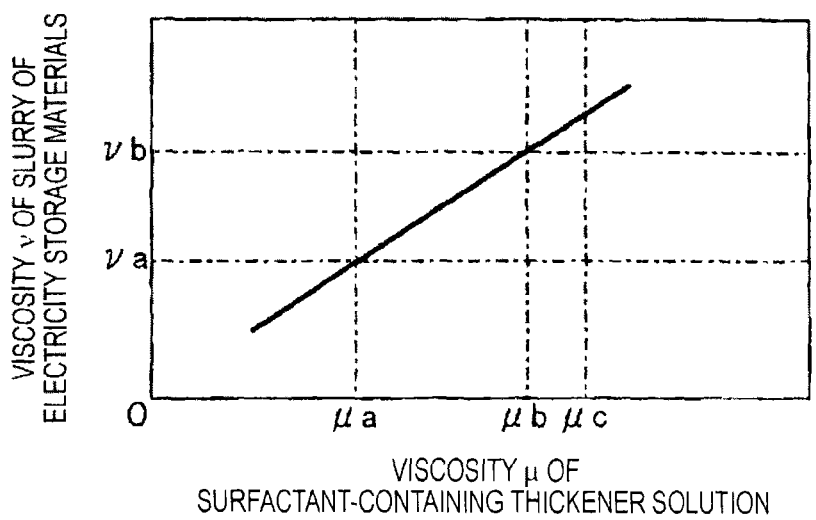
FIG. 7 is a presentation which shows a relationship between the viscosity of a final slurry of an active material and the viscosity of the surfactant-containing thickener solution.

Here, the viscosity regulation of the surfactant-containing thickener solution is explained. As shown in FIG. 7, the viscosity v of the final slurry of electricity storage materials is proportional to the viscosity μ of the surfactant-containing thickener solution. The viscosity v of the slurry of electricity storage materials can hence be regulated to a value in a given range of va to vb, which is determined on the basis of a balance between the initial performance of the battery and suitability for application and drying steps, by regulating the viscosity μ of the surfactant-containing thickener solution to a given value.

The viscosity μ of the surfactant-containing thickener solution is regulated to either a value in the given viscosity range of μa to μb shown in FIG. 7 or a value μc which is higher by a given value than the upper limit μb of that given viscosity range. The viscosity regulation period for kneading the solution together with an active material in a powder or another form to obtain the viscosity of the final slurry of electricity storage materials can be shortened by regulating the viscosity of the surfactant-containing thickener solution to a value within the given viscosity range of μa to μb, which is close to the viscosity of the final slurry of electricity storage materials.

Consequently, the period when the active material receives shear force is shortened and, hence, the active material can be inhibited from being damaged. Furthermore, the reason why the viscosity μ of the surfactant-containing thickener solution may be the value μc, which is higher by a given value than the upper limit μb, is that it is possible to regulate this viscosity to a value within the given viscosity range of μa to μb by later adding a solvent thereto.

Figure 8:
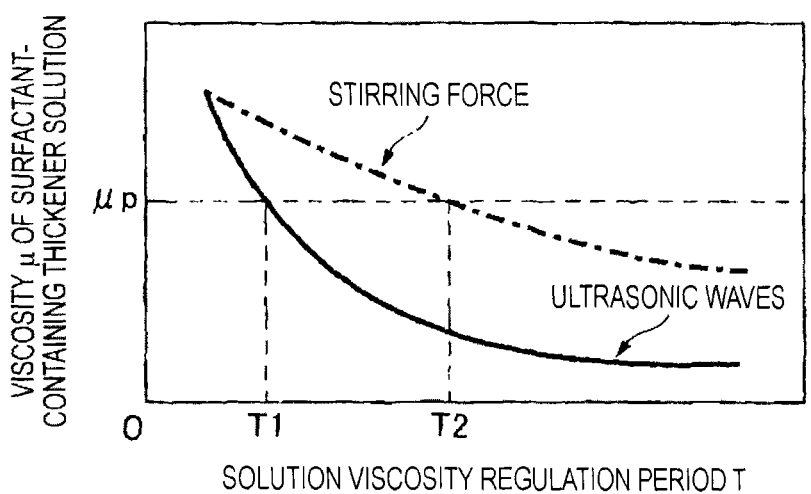
FIG. 8 is a presentation which shows changes with passage of time in viscosity regulation of a surfactant-containing thickener solution with microwaves and in viscosity regulation of a surfactant-containing thickener solution with stirring force.

The viscosity regulation of the surfactant-containing thickener solution may be conducted by cleaving the molecular chains of the thickener by shearing energy due to stirring force as before. In this embodiment, however, the viscosity regulation is conducted by cleaving the molecular chains of the thickener by both collision energy due to ultrasonic waves and the shearing energy. This is because the viscosity regulation of the surfactant-containing thickener solution by ultrasonic waves is more efficient than the viscosity regulation of the surfactant-containing thickener solution by stirring force as shown in FIG. 8.

Namely, the time period T required for regulating the viscosity of the surfactant-containing thickener solution to a target value of μp is T2 in the case of the regulation by stirring force. In contrast, in the case of the regulation by ultrasonic waves, the time period T can be as short as T1 (<T2). Consequently, the viscosity regulation by ultrasonic waves requires less electric power than the viscosity regulation by stirring force. Incidentally, the viscosity μ of the surfactant-containing thickener solution decreases as the viscosity regulation period T becomes longer, and finally converges to the viscosity of water.

Next, the production controller 6 operates the solution production device 2 and the active-material feeder 3 to supply the surfactant-containing thickener solution and an active material in a powder or another form to the mixture-conveying device 4 in given amounts (step S10 in FIG. 2).

Specifically, the solution production control unit 62 operates the constant-delivery pump 28 to supply a given amount of the surfactant-containing thickener solution to the rear-end-side portion of the pair of screws 42 via the supply line 27 and the operating 41a of the mixture-conveying device 4. The active-material introduction control unit 63 operates the low-frequency generator 32 to supply a given amount of an active material in a powder or another form to the rear-end portion of the pair of screws 42 via the supply line 33 and the opening 41a of the mixture-conveying device 4.

Next, the production controller 6 operates the mixture-conveying device 4 to convey the surfactant-containing thickener solution and the active material in a powder or another form (step S11 in FIG. 2).

Specifically, the mixture conveyance control unit 64 operates the driving motor 43 to rotate the two screws 42 on the respective axes. The pair of screws 42 thus stir and thereby mix the surfactant-containing thickener solution and the active material in a powder or another form, which are being supplied through the opening 41a of the housing 41, and convey the resultant mixture from the screw rear end toward the screw front end, while mixing the two ingredients, and the mixture is supplied to the mixture-kneading device 5 via the supply line 45. Since the powder of the active material has been rendered, by the surfactant, apt to be wetted by the thickener solution, the mixture of the active-material powder and the surfactant-containing thickener solution does not accumulate within the mixture-conveying device 4.

Next, the production controller 6 reads out the data on the kneading of a mixture of the surfactant-containing thickener solution and the active material in a powder or another form (step S12 in FIG. 2), operates the mixture-kneading device 5 (step 13 in FIG. 2), and assesses where a given kneading period has passed or not (step S14 in FIG. 2). At the time when the given kneading period has passed, the production controller 6 stops the operation of the mixture-kneading device 5 (step S15 in FIG. 2) to produce a final slurry of electricity storage materials.

Specifically, the mixture kneading control unit 65 reads the data on kneading period out of the storage unit 61, and operates the driving motor 53 to rotate the stirring propeller 52 for a given kneading period, thereby stirring and kneading the mixture supplied into the housing 51. At the time when the stirring propeller 52 has been rotated for the given kneading period, the mixture kneading control unit 65 stops the operation of the driving motor 53.

Figure 9:
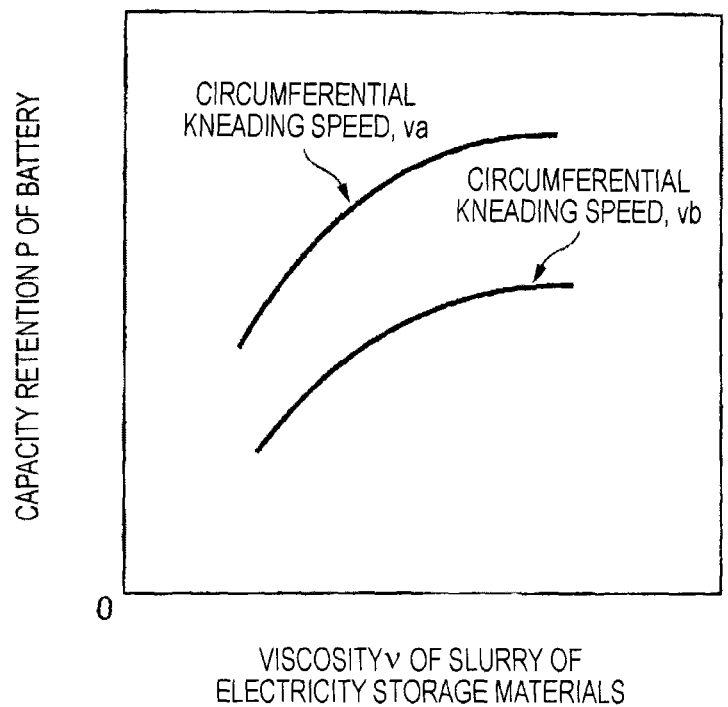
FIG. 9 is a presentation which shows relationships between the capacity retention of a battery, i.e., the durability (charge/discharge cycling characteristics) of a battery, and the viscosity of the slurry of an active material.

Here, kneading indexes and the setting of conditions are explained. As shown by the experimental results given in FIG. 9, the capacity retention P of a battery, i.e., the durability (charge/discharge cycling characteristics) of a battery, increases as the viscosity v of the slurry of electricity storage materials increases. However, an increase in the circumferential kneading speed v of the stirring propeller of the kneading device (va<vb) results in a decrease in the capacity retention P of the battery even when the kneading is conducted so that the resultant slurry of electricity storage materials has the same viscosity v.

As the circumferential kneading speed v of the stirring propeller increases, the number of collisions during the kneading increases and the probability that the particles of the active material are damaged thereby becomes high. In case where the particles of the active material are damaged and reduced into smaller particles, this active material has an increased surface area to accelerate decomposition of the electrolytic solution. It is therefore thought that the capacity retention P of the battery is considerably affected by the damage of the active-material particles.

Besides the circumferential kneading speed v of the stirring propeller, factors affecting the damage of the active-material particles are thought to include the period t of kneading the electricity storage materials and the solid content [(solid components)/((solid components)+(liquid component))] η of the electricity storage materials. In this connection, the number of collisions of the active-material particles is determined on the basis of the known mean free path using a model in which the active-material particles freely move in a given space. The cumulative collision energy D for the active material, which is an index for kneading, can be determined by multiplying the kinetic energy, $mv^2/2$, of the active-material particles by the number of collisions of the active-material particles, $\sqrt{2} \cdot \eta \sigma v$, and by the period of kneading the electricity storage materials, t, as shown by the following equation (1). Thus, the damaged state into which the active-material particles will come through kneading can be predicted before the kneading.

[Math. 1]

$$D = \left(\frac{mv^2}{2}\right) \times \left(\sqrt{2}\,\eta\sigma v\right) \times (t) \qquad (1)$$

In the equation, D is the cumulative collision energy for the active-material particles, m is the weight per particle of the active material, v is the circumferential kneading speed of the stirring propeller, η is the solid content of the electricity storage materials, σ is the average particle diameter of the active-material particles, and t is the period of kneading the electricity storage materials.

Figure 10:
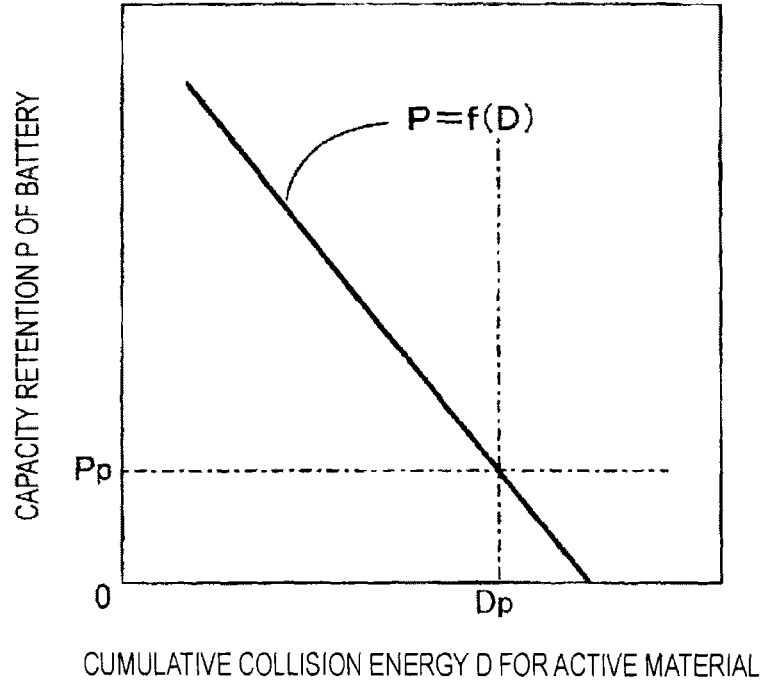
FIG. 10 is a presentation which shows a relationship between the capacity retention of a battery and the cumulative collision energy which was exerted on the active material.

Then, a relationship between the capacity retention P of the battery and the cumulative collision energy D for the active material is determined as shown in FIG. 10. This relationship is determined by regulating the following factors affecting the damage of the active-material particles: the circumferential kneading speed v of the stirring propeller; the solid content of the electricity storage materials (the solid content is regulated by changing the proportion of the solid components to the liquid component), and the electricity storage material kneading period t. The expression P=f(D) showing this relationship is determined, and the cumulative collision energy Dp for the active material which results in a minimum necessary capacity retention Pp of the battery is determined to set kneading conditions, i.e., the circumferential kneading speed v of the stirring propeller, the solid content η of the electricity storage materials, and the electricity storage material kneading period t, that result in a cumulative active-material collision energy of Dp or less.

As described above, the number of collisions of the active-material particles is determined herein on the basis of the mean free path of the active-material particles using a model in which the active-material particles freely move in a given space. Consequently, the cumulative active-material collision energy can be determined by multiplying the number of collisions of the active-material particles by the kinetic energy of the active material and by the period of kneading the electricity storage materials. The cumulative collision energy can be used as an index to the durability of the battery. Since the damaged state into which the active-material particles will come through kneading can be predicted before the kneading, it is possible to knead the active-material particles in such a manner that the particles are less damaged. Consequently, batteries having high durability can be produced.

According to the electricity-storage-material production apparatus 1 described above, since a surfactant has been added to the thickener solution, the surfactant-containing thickener solution has a reduced surface tension, resulting in an increase in the rate of wetting of the active-material powder by the surfactant-containing thickener solution. Consequently, the active-material powder has a higher affinity for the surfactant-containing thickener solution and, hence, the mixture of the surfactant-containing thickener solution and the active-material powder can be smoothly conveyed without accumulating within the mixture-conveying device 4. The production of a slurry of electricity storage materials can be implemented as a continuous process.

Furthermore, since the active-material powder shows improved wettability by the surfactant-containing thickener solution, it is possible to disperse the powder in the surfactant-containing thickener solution in a short time period to inhibit the active material from being damaged. Since the active-material powder evenly disperses in the surfactant-containing thickener solution, an improvement in electrode quality can be attained and battery performance can be heightened.

Moreover, since the surfactant-containing thickener solution is regulated so as to have a suitable viscosity, the mixture including the active-material powder, the surfactant-containing thickener solution, etc. is kneaded so as to have a suitable viscosity. Consequently, the slurry of electricity storage materials is evenly applicable to substrates, thereby attaining an improvement in coating film quality.

Incidentally, the embodiments described above include a step in which a surfactant and a thickener are introduced and dissolution of the surfactant and the thickener and viscosity regulation of the resultant solution are performed. However, the step may be modified so that a thickener is introduced and dissolved and the resultant solution is subjected to viscosity regulation, before a surfactant is introduced. It is, however, noted that in case where the viscosity regulation of the solution and the introduction of a surfactant are conducted in the reverse order, the surfactant is difficult to diffuse in the solution which has not undergone viscosity regulation, because this solution has high viscosity. It is therefore necessary in this case to take a measure, e.g., to prolong the period of propagating ultrasonic waves. Furthermore, the dissolution of a surfactant and a thickener and the viscosity regulation of the resultant solution may be conducted in parallel with each other.

In the embodiments described above, an explanation was given on an electricity-storage-material production apparatus 1 which had a configuration equipped with a solution production device 2 having both a microwave device 22 and an ultrasonic wave device 32. However, the electricity-storage-material production apparatus may be one that has the configuration in which the solution production device 2 has been replaced with a dissolution device having a stirring propeller.

Although the embodiments described above relate to the production of an electricity storage material for the negative electrodes of lithium ion secondary batteries, the invention is applicable to the case of producing an electricity storage material for the positive electrodes of lithium ion secondary batteries. In this case, microwaves are propagated at the time when a binder, e.g., poly(vinylidene fluoride), is dissolved in a solvent, e.g., N-methylpyrrolidone, but ultrasonic waves are not propagated at the time when a conduction aid, e.g., acetylene black, is mixed with the resultant solution. This is because the viscosity of the solution can be regulated by regulating the amount of the conduction aid, e.g., acetylene black, to be mixed.

Electricity storage materials to which the present invention is applicable are not limited to electricity storage materials for the electrodes of lithium ion secondary batteries, and the invention is applicable to any electricity storage materials, e.g., materials for capacitors.

According to the present invention, since a surfactant has been added to the thickener solution, the surfactant-containing solution of the thickener has a reduced surface tension and the rate of the wetting of the active-material powder by the surfactant-containing thickener solution is increased. Consequently, the active-material powder has an improved affinity for the surfactant-containing thickener solution and, hence, the mixture of the surfactant-containing thickener solution and the active-material powder can be smoothly conveyed without accumulating within the production apparatus.

Furthermore, since the active-material powder has improved wettability by the surfactant-containing thickener solution, it is possible to disperse the powder in the surfactant-containing thickener solution in a short time period to inhibit the active material from being damaged. Since the active-material powder evenly disperses in the surfactant-containing thickener solution, an improvement in electrode quality can be attained and battery performance can be heightened.

The present invention makes it possible to continuously treat the kneaded mixture of an electricity storage material.

According to the present invention, since the surfactant-containing thickener solution is regulated so as to have a suitable viscosity, the mixture including a powder of the active material, the surfactant-containing thickener solution, etc. is kneaded so as to have a suitable viscosity. Consequently, the kneaded mixture of an electricity storage material is evenly applicable to substrates, thereby attaining an improvement in coating film quality.

According to the method of the present invention for producing an electricity storage material, the same effects as those of the production apparatus an electricity storage material described above are produced.

Since fluorochemical materials have high chemical stability and are less apt to decompose during charge/discharge, battery performance can be heightened.

Since fluorochemical materials having an affinity for water can enhance the wettability of the active-material powder by the solution of the thickener, battery performance can be further heightened.

In case where the addition amount of the surfactant is less than 0.01% by weight, the active-material powder has too long a sedimentation time. In case where the addition amount thereof exceeds 0.3% by weight, the thickener solution froths and is difficult to handle. Consequently, in cases when the addition amount thereof is 0.01-0.3% by weight, a satisfactory kneaded mixture can be obtained.

What is claimed is:

1. A production apparatus for producing an electricity storage material, comprising:
   a solution production device including a first hopper containing a surfactant, a second hopper containing a thickener, and a housing on top of which the first hopper and the second hopper are disposed, the first hopper and the second hopper introducing the surfactant and the thickener respectively into the housing to form a solution of the thickener and the surfactant;
   an active material feeder containing a powder of an active material;
   a mixture conveying device connected to both a downstream end of the housing and a downstream end of the active material feeder, the mixture conveying device configured to convey a mixture of the solution and the powder of the active material; and
   a mixture-kneading device downstream of the mixture conveying device configured to knead the mixture, wherein the surfactant is a hydrophilic fluorochemical material mixed at 0.01-0.3% by weight of the solution.

2. The production apparatus according to claim 1, wherein the solution production device includes:
   a microwave device on a top of the housing configured to dissolve the surfactant and the thickener in a solvent supplied to the housing by a solvent reservoir tank, and
   a ultrasonic wave device on an outer periphery of the housing configured to regulate the solution so as to have a given viscosity.

3. The production apparatus according to claim 1, wherein the mixture-kneading device includes a stirring propeller configured to knead the mixture of the solution together with the powder of the active material.

4. The production apparatus according to claim 1, wherein the mixture-conveying device includes two parallel screws that supply the mixture to the mixture-kneading device.

5. The production apparatus according to claim 1, wherein the active material is a lithium nickel oxide.

* * * * *